United States Patent
Schneider et al.

(10) Patent No.: US 11,018,857 B2
(45) Date of Patent: May 25, 2021

(54) ENCRYPTION SCHEME USING MULTIPLE PARTIES

(71) Applicant: ABB Schweiz AG, Baden (CH)

(72) Inventors: Johannes Schneider, Fislisbach (CH); Matus Harvan, Luxembourg (LU); Roman Schlegel, Wettingen (CH); Sebastian Obermeier, Rietheim (CH); Thomas Locher, Zürich (CH)

(73) Assignee: ABB Schweiz AG, Baden (CH)

( * ) Notice: Subject to any disclaimer, the term of this patent is extended or adjusted under 35 U.S.C. 154(b) by 198 days.

(21) Appl. No.: 15/872,201

(22) Filed: Jan. 16, 2018

(65) Prior Publication Data
US 2018/0227121 A1    Aug. 9, 2018

Related U.S. Application Data

(63) Continuation of application No. PCT/EP2016/066683, filed on Jul. 13, 2016.

(30) Foreign Application Priority Data

Jul. 16, 2015   (EP) .................................... 15177097

(51) Int. Cl.
*H04L 9/08*   (2006.01)
*H04L 9/00*   (2006.01)
*H04L 9/14*   (2006.01)

(52) U.S. Cl.
CPC ............ *H04L 9/0861* (2013.01); *H04L 9/008* (2013.01); *H04L 9/14* (2013.01); *H04L 2209/46* (2013.01)

(58) Field of Classification Search
CPC ......... H04L 9/0861; H04L 9/14; H04L 9/008; H04L 2209/46
(Continued)

(56) References Cited

U.S. PATENT DOCUMENTS 5,757,923 A * 5/1998 Koopman, Jr. ......... G06F 7/584
                                                              380/46
7,330,549 B2 * 2/2008 Girault .................. H04L 9/3013
                                                              380/30
(Continued)

FOREIGN PATENT DOCUMENTS

WO    2013188929 A1    12/2013
WO    2014118230 A1    8/2014

OTHER PUBLICATIONS

European Patent Office, International Search Report & Written Opinion issued in corresponding Application No. PCT/EP2016/066683, dated Oct. 14, 2016, 12 pp.
(Continued)

*Primary Examiner* — Aravind K Moorthy
(74) *Attorney, Agent, or Firm* — Taft Stettinius & Hollister LLP

(57) ABSTRACT

The present invention discloses a method for computing a secret value including a first secret using a function including an operation, comprising: computing, by a host, a first encrypted value of the first secret with a first key; sending, by the host, the first encrypted value to a value holder and the first key to a key holder, wherein the value holder and the key holder are independently trusted by the host; computing, by the value holder, a computed encrypted value from the first encrypted value using the function; and computing, by the key holder, a computed key from the first key using the function.

18 Claims, 7 Drawing Sheets

(58) Field of Classification Search
USPC .................................................. 380/278
See application file for complete search history.

(56) References Cited

U.S. PATENT DOCUMENTS

| | | | | |
|---|---|---|---|---|
| 8,719,568 B1* | 5/2014 | Antypas, III | ....... | H04L 63/0884 713/168 |
| 8,996,873 B1* | 3/2015 | Pahl | ....... | H04L 63/061 713/173 |
| 2004/0165726 A1* | 8/2004 | Yamamichi | ....... | H04L 9/085 380/277 |
| 2004/0179682 A1* | 9/2004 | Soliman | ....... | H04L 9/0822 380/44 |
| 2006/0212506 A1* | 9/2006 | Vasyltsov | ....... | H04L 9/004 708/620 |
| 2006/0262933 A1* | 11/2006 | Furukawa | ....... | H04L 9/14 380/281 |
| 2008/0019504 A1* | 1/2008 | Han | ....... | H04L 9/0631 380/28 |
| 2008/0263363 A1* | 10/2008 | Jueneman | ....... | H04L 63/061 713/184 |
| 2009/0202069 A1* | 8/2009 | Cox | ....... | H04L 9/0822 380/44 |
| 2010/0150352 A1* | 6/2010 | Mansour | ....... | H04L 9/088 380/281 |
| 2010/0211797 A1* | 8/2010 | Westerveld | ....... | H04N 7/165 713/185 |
| 2011/0110525 A1* | 5/2011 | Gentry | ....... | H04L 9/14 380/285 |
| 2011/0113254 A1* | 5/2011 | Livesey | ....... | H04L 9/0656 713/176 |
| 2011/0206200 A1* | 8/2011 | Sovio | ....... | H04L 9/3073 380/30 |
| 2011/0235806 A1* | 9/2011 | Fukuda | ....... | H04L 9/0825 380/282 |
| 2011/0286594 A1* | 11/2011 | Resch | ....... | G06F 11/10 380/46 |
| 2011/0296203 A1* | 12/2011 | Henry | ....... | H04L 9/0618 713/190 |
| 2011/0307705 A1* | 12/2011 | Fielder | ....... | G06F 21/6209 713/181 |
| 2013/0013931 A1* | 1/2013 | O'Hare | ....... | H04L 9/085 713/189 |
| 2013/0086393 A1* | 4/2013 | Pogmore | ....... | H04L 9/0869 713/189 |
| 2013/0212393 A1* | 8/2013 | D'Souza | ....... | H04L 9/30 713/171 |
| 2013/0246812 A1* | 9/2013 | Resch | ....... | G06F 21/6218 713/193 |
| 2014/0075190 A1* | 3/2014 | Nagai | ....... | H04L 9/3273 713/168 |
| 2014/0082367 A1* | 3/2014 | Lambert | ....... | G06F 21/31 713/183 |
| 2014/0161259 A1* | 6/2014 | Uchida | ....... | H04N 21/4405 380/277 |
| 2015/0188704 A1* | 7/2015 | Takenaka | ....... | H04L 9/3236 713/171 |
| 2015/0195089 A1* | 7/2015 | Yajima | ....... | H04L 9/0869 380/46 |
| 2015/0207630 A1* | 7/2015 | Shimoyama | ....... | G06Q 20/3823 713/186 |
| 2015/0263858 A1* | 9/2015 | Aumasson | ....... | H04L 9/0637 380/30 |
| 2015/0270962 A1* | 9/2015 | Hautier | ....... | H04L 9/0869 380/28 |
| 2015/0288514 A1* | 10/2015 | Pahl | ....... | H04L 9/085 713/171 |
| 2015/0349953 A1* | 12/2015 | Kruglick | ....... | H04L 63/061 713/171 |
| 2015/0381348 A1* | 12/2015 | Takenaka | ....... | H04L 9/008 380/30 |
| 2016/0028539 A1* | 1/2016 | Su | ....... | H04L 9/0861 713/171 |
| 2016/0127125 A1* | 5/2016 | Yagisawa | ....... | H04L 9/14 380/28 |
| 2016/0373418 A1* | 12/2016 | Stahl | ....... | G06F 21/33 |
| 2017/0048058 A1* | 2/2017 | Ren | ....... | H04L 9/30 |
| 2017/0142082 A1* | 5/2017 | Qian | ....... | H04L 63/0442 |
| 2017/0222800 A1* | 8/2017 | Haber | ....... | H04L 9/0861 |

OTHER PUBLICATIONS

European Patent Office, Extended Search Report issued in corresponding Application No. 15177097.1, dated Jan. 22, 2016, 9 pp.

Asharov, Gilad et al., "Multiparty Computation with Low Communication, Computation and Interaction via Threshold FHE", Lecture Notes in Computer Science, Jan. 19, 2012, pp. 1-16.

Intellectual Property of India, Examination Report issued in corresponding Indian application No. 201847005505, dated Jul. 27, 2020, 6 pp.

* cited by examiner

ENCRYPTION SCHEME USING MULTIPLE PARTIES

FIELD OF THE INVENTION

The invention relates to an encryption scheme using multiple parties, in particular, the multiple parties are independently trusted by a host providing a secret value to be computed using math or logical operation.

BACKGROUND OF THE INVENTION

Whenever a service provider offers a service to its customer to store and process data, cyber security concerns need to be addressed. In particular, privacy of the data should be guaranteed, such that one customer cannot access the data of the other customers.

Traditional approaches simply separate the data by user accounts, i.e., a database item contains an owner for the item, which is associated with a customer. However, given the large number of vulnerabilities of different applications, such an approach cannot be considered to be fully secure. If, for example, an SQL injection vulnerability is exploited, a hacker could copy the complete database and possibly release it.

This means that the customers who would like to store and perform computations on their own confidential data using the service provider's solutions potentially hosted by the service provider would have to trust the service provider as an organization and every individual employee such as database administrators as well as legal entities, since there are no efficient technical solutions that can enforce security. There are theoretical solutions to this problem, e.g. so-called fully homomorphic encryption schemes. However, current implementations are not useful in practice due to their high performance costs.

In fact, data privacy is also one of the main concerns regarding cloud computing and therefore also the main reason for customers not to store and process confidential data using infrastructure or services of third-party providers. There have also been several cases of data leakage at prominent operators such as Google or Yahoo.

DESCRIPTION OF THE INVENTION

It is therefore an objective of the invention to provide a method for computing a secret value using third-party maintained hosts, without leakage of confidential data to the third-party hosts. In other words, there is also an objective of the present invention to provide an efficient implementation of a system that allows secure computation over confidential data.

This objective is achieved by a method and a device according to the independent claims. Preferred embodiments are evident from the dependent patent claims.

The present invention provides a system and a method for performing arbitrary computations on encrypted data using a network of multiple parties.

In particular, the present invention provides a method for computing a secret value comprising a first secret using a function including an operation, comprising: computing, by a host, a first encrypted value of the first secret with a first key; sending, by the host, the first encrypted value to a value holder and the first key to a key holder, wherein the value holder and the key holder are independently trusted by the host; computing, by the value holder, a computed encrypted value from the first encrypted value using the function; and computing, by the key holder, a computed key from the first key using the function.

According to another aspect, the present invention provides a system for computing a secret value comprising a first secret using a function including an operation, comprising: a host configured to compute a first encrypted value of the first secret with a first key; a value holder configured to receive the first encrypted value from the host; a key holder configured to receive the first key from the host; wherein the value holder and the key holder are independently trusted by the host; and wherein the value holder is further configured to compute a computed encrypted value from the first encrypted value using the function, the key holder is configured to compute a computed key from the first key using the function.

The host can be one or more computers maintained by the customer, while each of the value holder and the key holder can be one or more computers maintained by two independent service providers that are trusted by the client. The host, the value holder and the key holder are connected via a data communication network. They can also be distributed in one or more computer clouds.

According to an exemplary embodiment, the method further comprises: indicating, by the host, that the first encrypted value is of type of encrypted value and the first key is of type of key. Consequently, the value holder and the key holder know the type of the data to be computed, i.e. either a key or an encrypted value, thereby facilitating the computation, in particular for certain function including operation like trigonometric.

According to an exemplary embodiment, the method further comprises: receiving, by the host, the computed encrypted value and the computed key, independently from the value holder and the key holder; and decrypting, by the host, the computed encrypted value from the computed encrypted value using the computed key, to obtain a computed secret value.

The secret value contains information that needs to be processed, preferably using trusted computers of the service provider. However, due to data privacy, the contents of the secret value should not be disclosed to the service provider. According to the method of the present invention, the secret value will be encrypted, and the encrypted value and the key used for the encryption are sent to the two independent service providers, i.e. value holder and key holder. None of the service providers alone can decrypt the encrypted value. Upon receiving the encrypted value and the key, the value holder and the key holder can compute them independent from each other. The computed results, i.e. the computed encrypted value and the computed key, can be sent back to the host independently from the value holder and the key holder. The host can decrypt the computed secret value using the computed encrypted value and the computed key. In the whole process, only the host has the encrypted value and the key as well as the computed encrypted value and the computed key. That is only the host is capable to decrypt the secret value and the computed secret value. The value holder and the key holder have either the encrypted value or the key, which cannot decrypt the secret value or the computed secret value.

According to an exemplary embodiment, the secret value comprises a second secret, and the operation comprises at least one of: multiplication, logical AND, addition, or logical XOR of the first and second secret; and wherein the method further comprises: computing, by the host, a second encrypted value of the second secret using a second key.

According to an exemplary embodiment, the method further comprises: sending, by the host, the second encrypted value to the value holder and the second key to the key holder; computing, by the value holder, the computed encrypted value from the first and second encrypted value using an encryption schema having distributive and/or associative properties; computing, by the key holder, the computed key from the first and second key using the encryption schema. Alternatively, the method further comprises: sending, by the host, the second encrypted value to the key holder and the second key to the value holder; computing, by the value holder, the computed encrypted value from the first encrypted value and the second key using an encryption schema having distributive and/or associative properties; computing, by the key holder, the computed key from the second encrypted value and the first key using the encryption schema. In the first alternative, both encrypted values E1 and E2 are computed by the value holder and both keys K1 and K2 are computed by the key holder. In the second embodiments the value holder is responsible for computation of the first encrypted value E1 and the second key K2, while the key holder is responsible for computation of the second encrypted value E2 and the first key K1. Both alternatives has one common character, i.e. the encrypted value and the key used for generating that encrypted values are computed separately by independent service providers.

The encryption schema according to a distributive property can be explained as follows: (s1 op1 k1) op2 (s2 op1 k2)=(s1 op2 s2) op1 (k1 op2 s2) op1 (k2 op2 s1) op1 (k1 op2 k2), where s1 and s2 are secrets, k1 and k2 are keys and an associative property (s1 op1 k1) op1 k2=s1 opt (k1 op1 k2), where op1 is the encryption operation and can be for instance the addition or XOR operation and op2 the multiplication or AND operation, potentially using modulo a number for each term, e.g. (1+2)*(3+4)=1*3+2*3+4*1+2*4=11 and (1+2)+3=1+(2+3)=6.

According to an alternative exemplary embodiment, where the secret value comprises a second secret and the operation comprises at least one of: multiplication, logical AND, addition, or logical XOR of the first and second secret; and wherein the method further comprises: computing a second encrypted value of the second secret from the first encrypted value and the first key; computing the computed key using the first key and a second key associated with the second encrypted value; and computing the computed encrypted value using either the second key or the computed key such that the computed encrypted value can be decrypted using either the second key or the computed key.

According to an exemplary embodiment, the encryption is performed using a single key with simple additive encryption, or simple XOR encryption using distinct keys for distinct values, or first multiplying the value to encrypt with a key being the same for all values used in the process and then performing simple additive encryption.

According to an exemplary embodiment, where the operation comprises a trigonometric operator, the method comprising: computing, using the function including the trigonometric operator, the computed encrypted value based on the first key and a second key as well as the first encrypted value and a second encrypted value, wherein the second encrypted value is generated using the second key.

According to an exemplary embodiment, where the function comprises a logarithmic operator, comprising: computing, using the function including the logarithmic operator, the computed encrypted value based on the first encrypted value, a value depending on the first key, the first secret and a constant.

The present invention also relates to a computer program product including a computer readable medium containing therein the computer program code for performing steps of the method according to the present invention.

In comparison to some of the current approaches based on a single "cloud provider", the present invention provides a practical and implementable solution replaces the "single party" concept with a solution using multiple parties, i.e. the encrypted value and the key used for generating the encrypted value are computed by independent trusted service providers. The solution is more secure since the probability that two parties collude is much lower than a single party. Moreover, the customers can be also involved as additional parties, e.g. each party participates in the computation and executes the same basic operations on its data as all other parties—some parties might perform additional operations. The encryption schemes according to the present invention are particularly effective for executing basic operations such as addition and multiplication within such a network.

Moreover, the performance is a key differentiating factor in the present invention. Making the customer trust the solution is also an important factor. Trust can be established by giving evidence of the correctness of the proposed system. Therefore, the development of an efficient and provably secure system is the fundamental problem, which is solved in the present invention. By how much the performance can be improved compared to known schemes depends on the exact algorithm that are evaluated and the network architecture of the parties involved in the computation. The performance gains using present invention amounts a factor 1000 or more. For example, using conventional schemes to compute the variance of 100,000 128-bit numbers could take roughly 10,000 s. The present invention yields a speed-up of approximately factor 1000-10000 using same standard hardware, even if all parties are placed on different continents.

For cloud computing applications, the service provider should be able to perform many different types of computation with particular focus on mathematical operations for data analytics and control in a secure manner and in "reasonable" time possibly in real-time. The system should also guarantee the confidentiality of the data as well as correctness of computation, i.e. integrity. For specific products of the service provider, the system should be able to perform any sort of database operations and queries relevant to the customer. Security in current approach relies on trusting employees and also on the correctness of the implementations of a service. However, both assumptions have been shown to be breakable in the past. Showing correctness of large software products is theoretically impossible, whereas proving security properties of certain cryptographic methods is feasible.

The present invention is not limited to applications running in a cloud infrastructure, virtual environment located in a remote network, or other trusted computing network. Any application where private information should be processed and stored and multiple parties are involved can benefit from the present invention. As an additional example, consider data aggregation in low power sensor networks where the energy consumption of individual devices, which are typically battery-powered, should be minimized. This reduces maintenance costs and can prolong the lifetime of the system. It should be possible to do data aggregation for any kind of aggregation function. Currently, secure aggregation can only be done for simple operations such as additions. Thus, commercial products do not employ the technique.

BRIEF DESCRIPTION OF THE DRAWINGS

The subject matter of the invention will be explained in more detail in the following text with reference to preferred exemplary embodiments which are illustrated in the attached drawings, in which.

DETAILED DESCRIPTION OF PREFERRED EMBODIMENTS

As described before, the present invention introduces a system for performing arbitrary computations on encrypted data using a network of multiple parties. Hereinafter, the present invention describes the general workings at first, before discussing applications.

A fully homomorphic encryption scheme should allow one to perform additions and multiplications or bitwise "AND" and "XOR" operations on encrypted data. These operations enable the evaluation of any Boolean circuit, preferably together with memory. This makes it possible to compute anything that can be computed with an ordinary PC.

Figure 1:
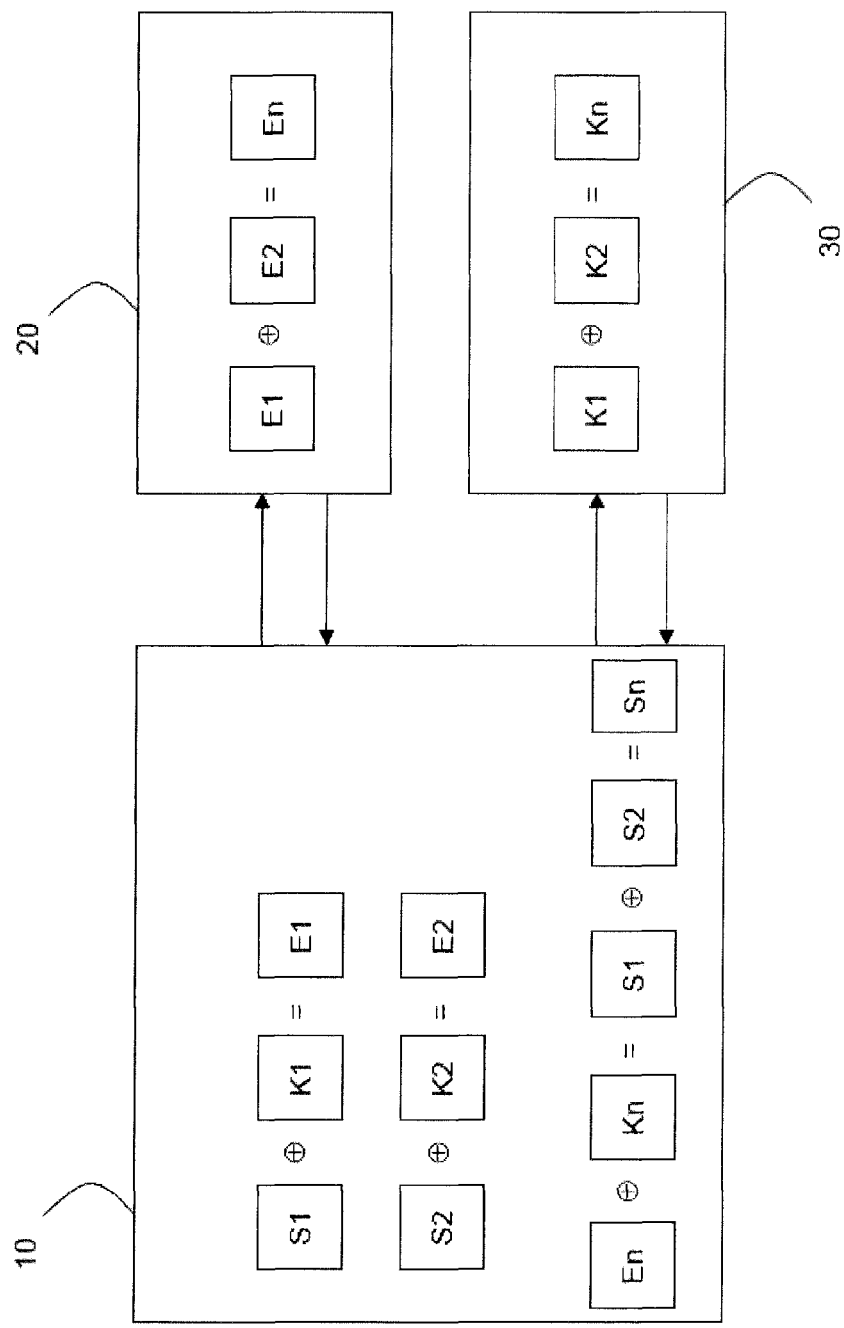
FIG. 1 schematically shows a network for securely computing the bitwise XOR of two numbers, according to the present invention.

FIG. 1 describes the simplest operation, i.e., an XOR of two numbers that are secret. In particular, a client host wants to obtain the result of "S1 XOR S2" for two arbitrary numbers "S1" and "S2". However, the client does not want to perform the computation himself, but using external service provider's computers. The network according to the present invention comprises the client host, the key holder and the encrypted value holder, where in order to simplify the name the latter will be also called value holder hereinafter. The key holder maintains all keys used for encryption and decryption but never obtains any encrypted values. The encrypted value holder only receives and transmits encrypted values. Data privacy of the secret S1 and S2 as well as the result "S1 XOR S2" can be ensured as long as the encrypted value holder and the key holder do not collude.

To perform an XOR operation, the client encrypts the data, i.e., "S1" and "S2", by choosing random keys K1 and K2. The keys are sent to the key holder and the encrypted values to the value holder. Each party computes the XOR of its received value. The result of the XOR is sent by each party to the client. The client host decrypts the result by performing an XOR of the received values.

Figure 2:
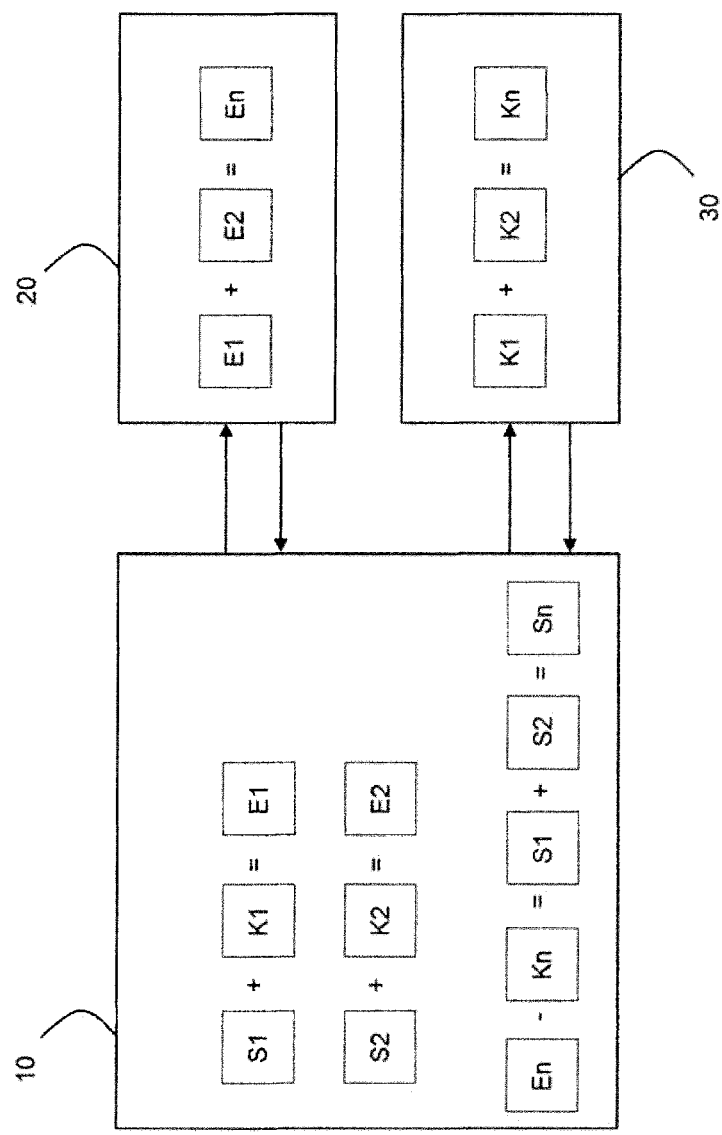
FIG. 2 schematically shows a diagram for securely performing the arithmetic addition of two secrets using the value holder and the key holder maintained by independent service providers.

FIG. 2 shows a diagram of arithmetic addition operation that works in a similar way as XOR operation, where the operation in step 4 of the FIG. 1 is replaced by addition. The secret value comprising a first secret S1 and a second secret S2 is hosted by the client host and needs to be computed using the function including addition operation, in order to obtain the computed secret Sn. The client would like to perform the computational tasks using the computers provided by the service providers, without disclosing the secret values including the first secret S1 and second secret S2.

The client host 10 generates a first encrypted value E1 of the first secret S1 using a first key K1 and a second encrypted value E2 of the second secret S2 using a second key K2. The host 10 sends the first E1 and the second encrypted value E2 to a value holder 20, and sends the first K1 and the second key K2 to a key holder. The value holder and the key holder are independently trusted by the client host and maintained by independent service providers. The value holder and the key holder may in the same network of the client host or distributed in one or more computer clouds. Further, the value holder and the key holder may run different operating systems so that an attacker has to know vulnerabilities of several operating systems to retrieve the secrets.

Upon receiving the encrypted values E1 and E2, the value holder 20 computes a computed encrypted value En by performing the addition of the first E1 and second encrypted value E2. At the same time, upon receiving the keys K1 and K2, the key holder computes a computed key Kn by performing the addition of the first K1 and second key K2.

After the computation, the value holder and the key holder send the computed encrypted value En and the computed key Kn to the client host, independently. Then, the client host 10 can decrypt the computed secret Sn from the computed encrypted value En using the computed key Kn.

Figure 3:
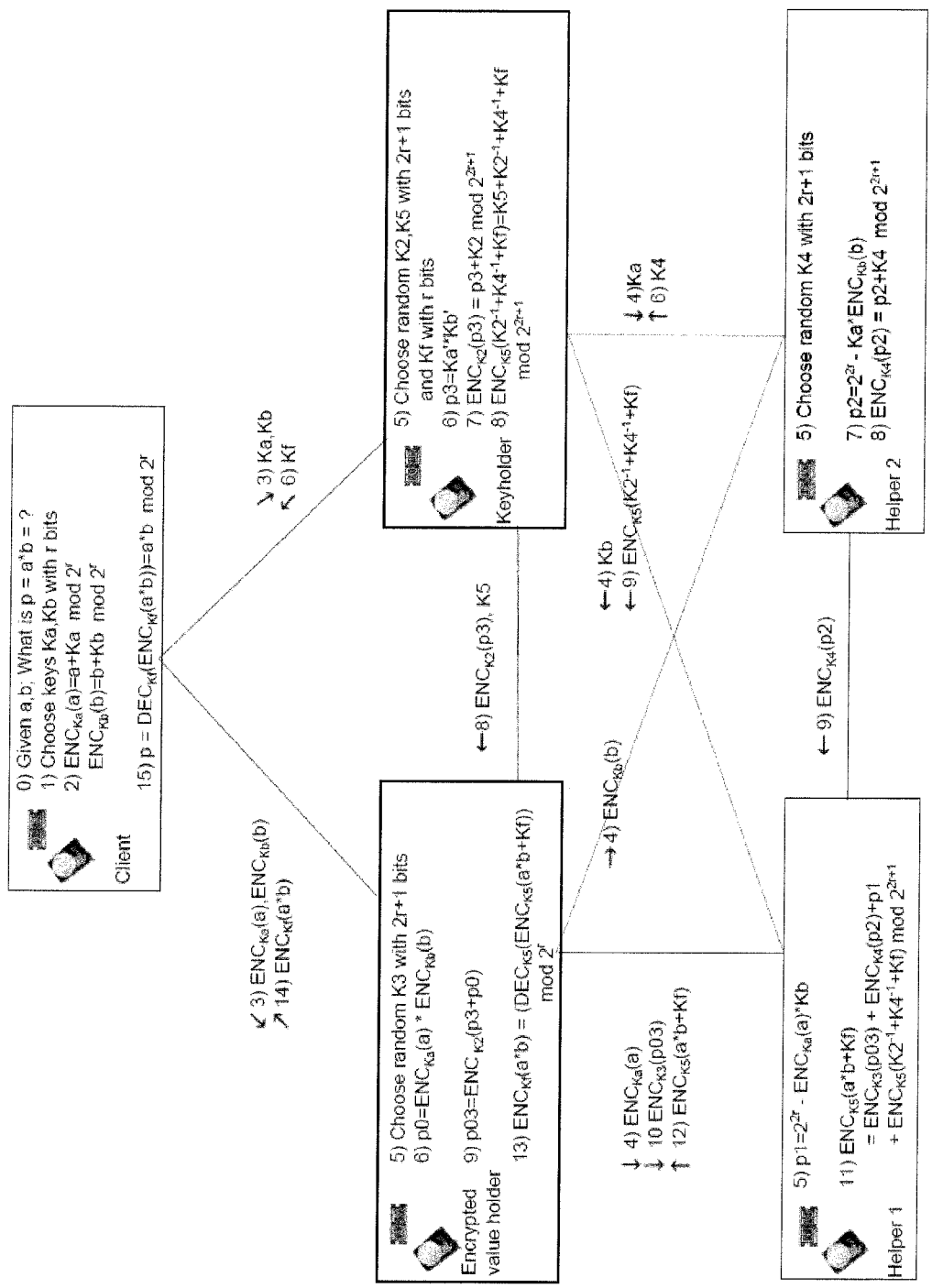
FIG. 3 schematically shows a network for securely performing the arithmetic addition or multiplication using four independent service providers.

FIG. 3 shows a network for securely performing the function including multiplication operation using four independent service providers, i.e. encrypted value holder, key holder, helper 1 and helper 2. Each of the service provides computes only a partial result, which is aggregated to get the final result of the multiplication.

The client 10 first encrypts the secret values S1 and S2 indicated as "a" and "b" in the drawing, to obtain the encrypted values $ENC_{Ka}(a)$ and $ENC_{Kb}(b)$ that use the keys $K_a$ and $K_b$. Then, the client 10 distributes the encrypted values and keys to the service providers, see steps 1 to 3. Note, the encrypted value and the key are used for generating the encrypted value are not distributed to the same servicer provider, to avoid that any of the parties can decrypt the contents of the secrets. In other words, $ENC_{Ka}(a)$ and the key $K_a$ are separated on different service providers. The same applies to $EN_{Kb}(a)$ and the key $K_b$.

The partial results are computed and encrypted, see steps 4 to 8, the encrypted partial results are collected and combined, see steps 9 to 11, and re-encrypted with a smaller key, see steps 12 to 13, partially also step 11. Then, the client 10 receives the encrypted result and can decrypt it to get the plaintext result, i.e. the computed secret.

To evaluate a general expression, the key—and the encrypted value holder store partial results and iteratively perform multiplications and additions. In particular, the client transmits the expression to evaluate to the encrypted value holder and the key holder. It also transmits the encrypted values of all variables in the expression to the encrypted value holder and the keys to the key holder. For example, to evaluate a product of three or more terms, e.g., a×b×c, the network first computes a×b and as a second step it multiplies the result (a×b) of the first step with c. In the same manner to add three or more terms, e.g., a+b+c, first a+b is computed and then (a+b) is added to c.

There are several extensions and optimizations such as ensuring integrity, i.e., ensuring that data or computation cannot be forged. The program code can also be hidden, i.e., the algorithm is kept private at the client.

Figure 3A:
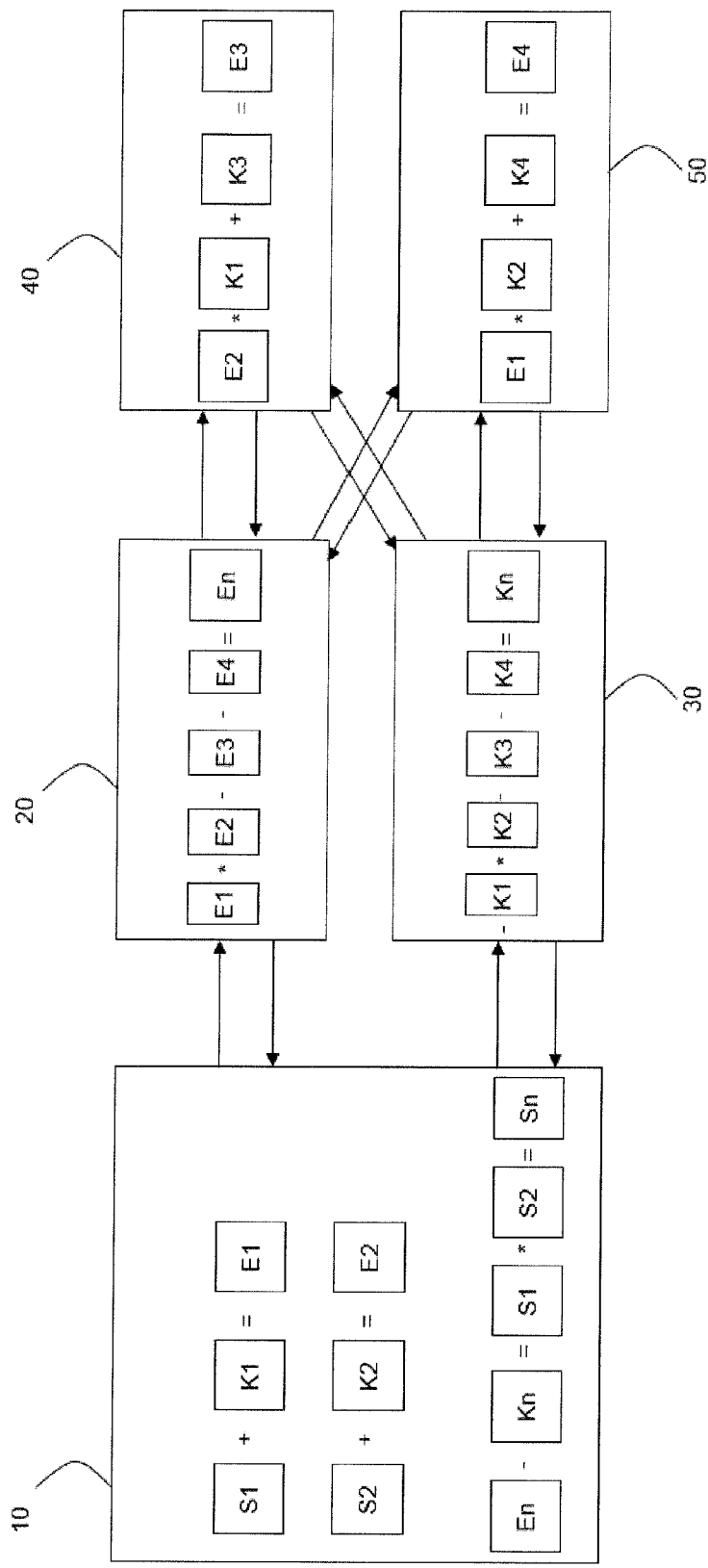
FIG. 3a schematically shows a process diagram for securely performing the arithmetic addition multiplication or addition using four independent service providers.

FIG. 3a shows a diagram of the multiplication or addition operation according to FIG. 3. For arithmetic operation such as addition or multiplication, it works similarly as for logical operation XOR, where the XOR operation is replaced with addition or multiplication, e.g. using the encryption and decryption scheme mentioned for multiplication, i.e., steps 1, 2 and 21 in FIG. 2.

In addition to the steps explained for FIG. 2, there are two additional parties, i.e. a first and a second helper, involved in this exemplary embodiment. These helpers prevent further the leakage of the confidential data. The first 40 and second helper 50 are independently trusted by the client host 10, similar as the value holder 20 and the key holder 30.

In particular, the value holder or the client sends the first encrypted value E1 to the first helper 40 and the second encrypted value E2 to the second helper 50.

The key holder or the client sends the first key K1 to the second helper 50 and the second key K2 to the first helper 30.

The first helper 40 generates, using a first helper key K3, a first encrypted helper value E3 from the second encrypted value E2 and the first key K1. For the multiplication operation, the first encrypted helper value E3 is a product of the second encrypted value E2 and the first key K1. Then, the first helper 40 sends the first encrypted helper value E3 to the value holder 20 and the first helper key K3 to the key holder 30.

The second helper 50 generates, using a second helper key K4, a second encrypted helper value E4 from the first encrypted value E1 and the second key K2. For the multiplication operation, the second encrypted helper value E4 product of is the first encrypted value E1 and the second key K2. Then, the second helper 50 sends the second encrypted helper value E4 to the value holder and the second helper key K4 to the key holder.

Upon receiving the first and second helper encrypted values E3 and E4, the value holder 30 can compute the result, i.e. the computed encrypted value En using arithmetic operations such as addition, subtraction and multiplication: $En=E1 \times E2-E3-E4$. Similarly, the computed key Kn can be obtained by the key holder using arithmetic operations such as addition, subtraction and multiplication: $Kn=K1 \times K2-K3-K4$.

Once the En and Kn have been computed by the value holder and the key holder, the client host can receive or retrieve them for decrypting the computed secret value Sn.

Figure 4:
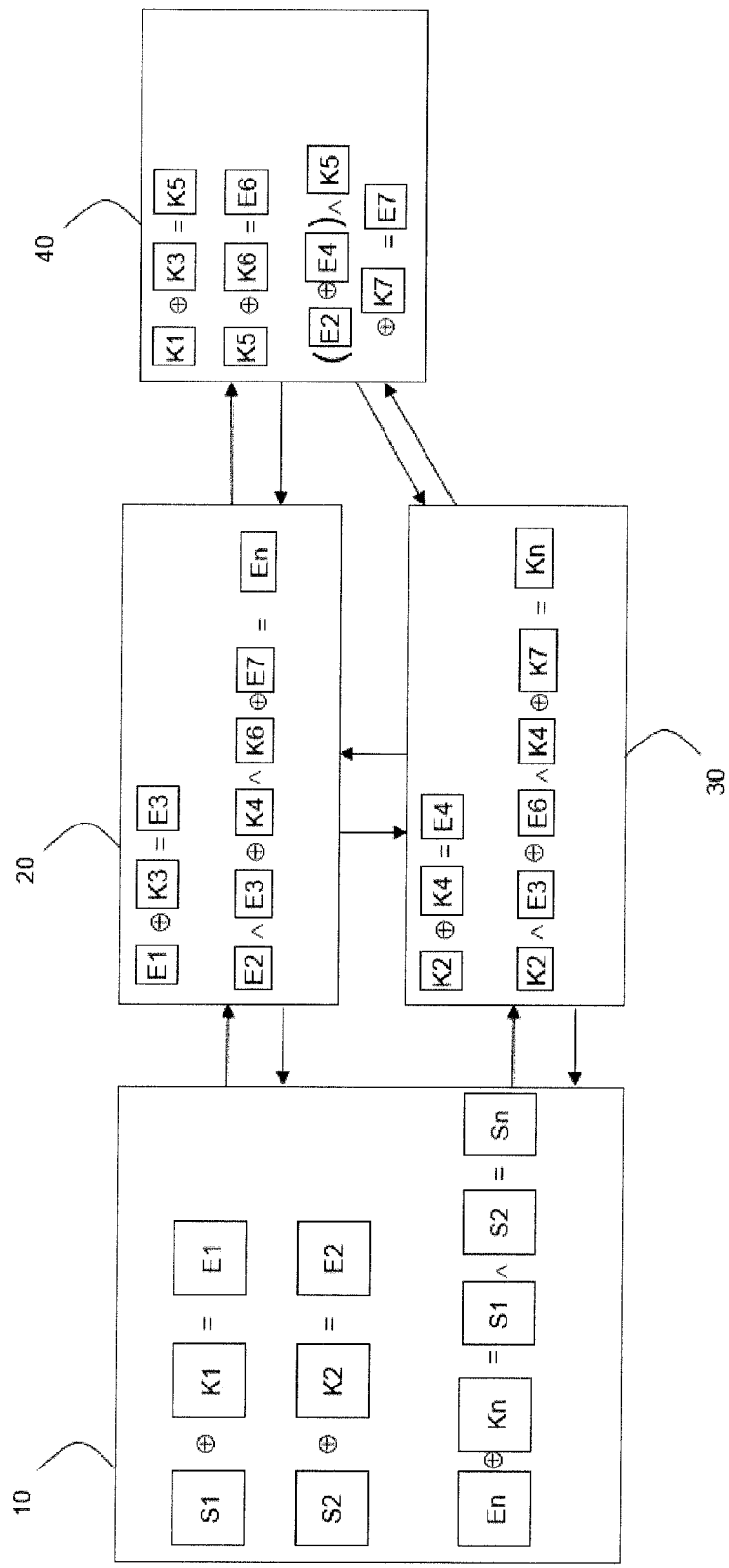
FIG. 4 schematically shows a network for securely performing the arithmetic addition multiplication or addition using three independent service providers.

FIG. 4 shows a network for securely performing the function including multiplication or AND operation. This exemplary embodiment is similarly to FIG. 3 but uses only three parties, i.e. one helper. This is achieved by using double encryption, i.e. the encrypted values and keys are encrypted again. In this second time encryption, the value holder, the key holder and the helper change their roles, again, in order to avoid that any of the parties can decrypt the contents of the secrets.

Figure 4A:
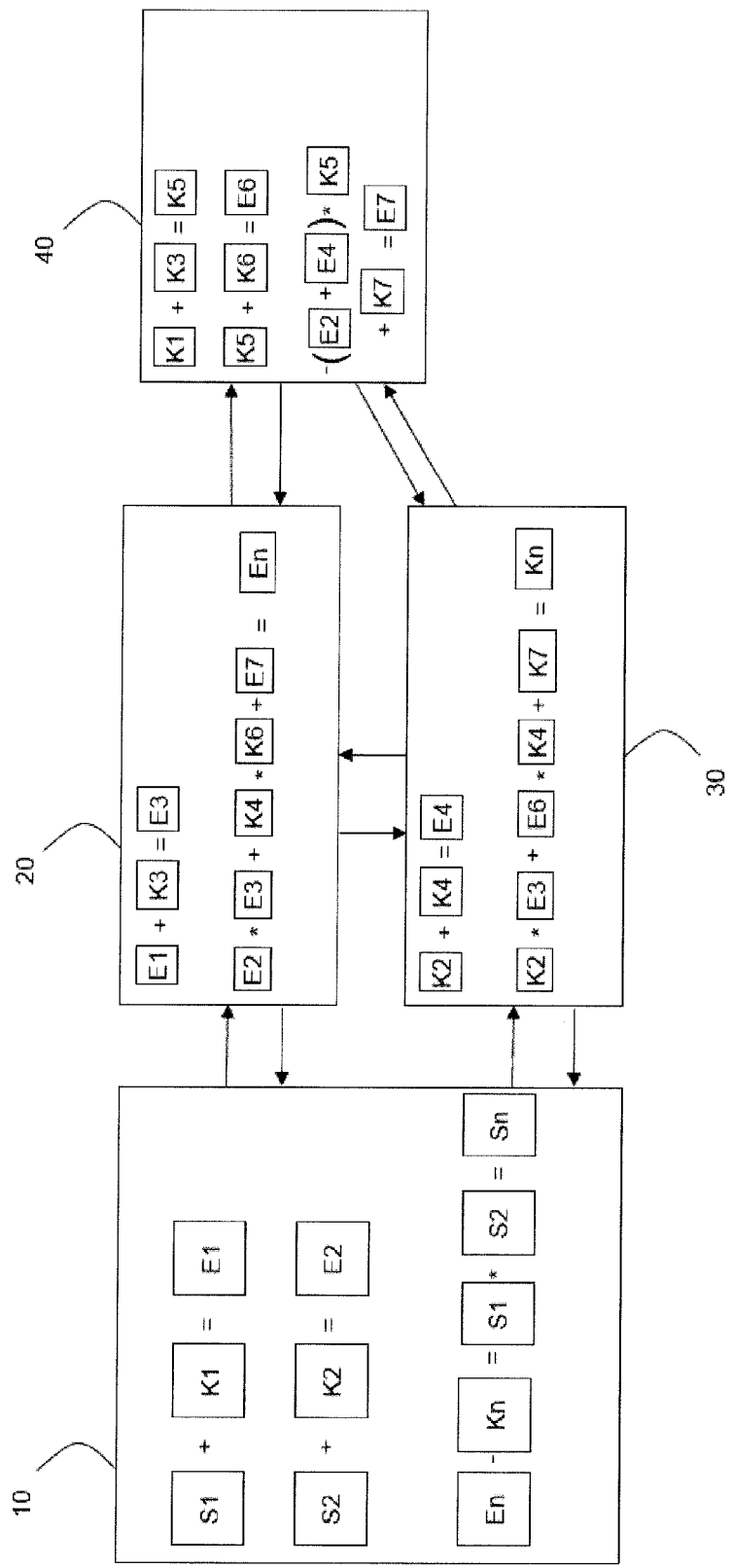
FIG. 4a schematically shows a process diagram for securely performing the arithmetic addition multiplication or addition using three independent service providers.

FIG. 4a shows the corresponding process diagram according to FIG. 3. In comparison to the embodiments showed by FIG. 3, in this exemplary embodiment, the value holder 20 generates a third encrypted value E3 using the first encrypted value E1 and a third key K3. Then, the value holder sends the third encrypted value E3 to the key holder, and the second encrypted value E2 and the third key K3 to the helper 40.

The key holder generates a fourth encrypted value E4 using the second key K2 and a fourth key K4. Then, the key holder sends the fourth encrypted value E4 and the first key K1 to the helper 40, and the fourth key K4 to the value holder 20.

The helper 40 computes a fifth key K5 using the first K1 and the third key K3; a sixth encrypted value E6 using the fifth key K5 and a sixth key K6; and a seventh encrypted value E7 using a seventh key K7 and the operation: $E7=-E2 \times K5+K5 \times E4+K7$.

The helper 40 sends the seventh key K7 and the sixth encrypted value E6 to the key holder 30 and the sixth key to the value holder 20.

The value holder 30 computes the encrypted value En as a result using a second, third and sixth encrypted value and a fourth and sixth key, and sends the encrypted value En to the client.

computing by the key holder, the key Kn using a third and sixth encrypted value and second, fourth and seventh key, sends the key Kn to the client.

According to an exemplary embodiment, the method further comprising: computing, by the value holder 30, the computed encrypted value En as follows: $En=E2 \times E3+K4 \times K6+K7$; and computing, by the key holder 40, the computed key Kn as follows: $Kn=K2 \times E3+E6 \times K4+K7$.

Figure 5:
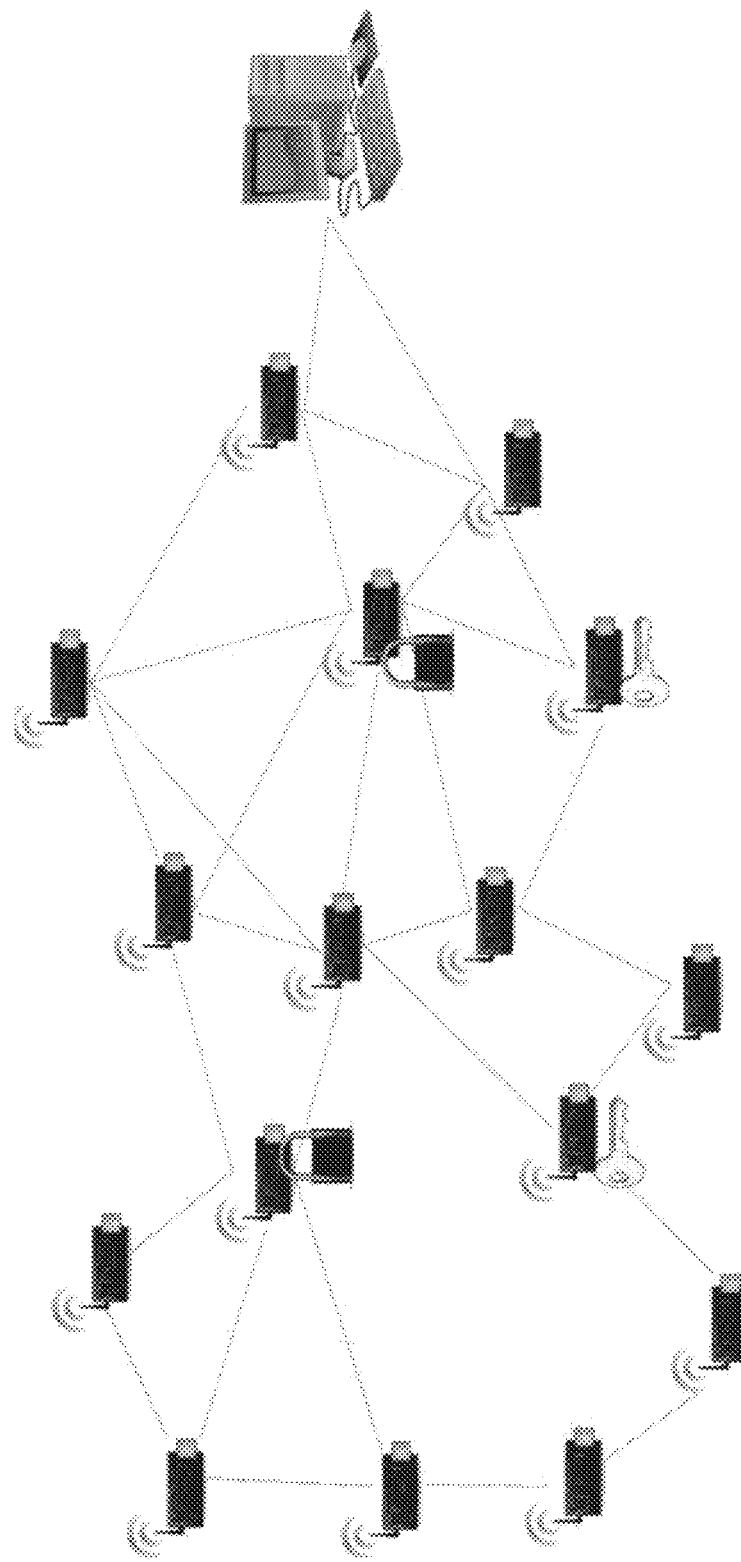
FIG. 5 schematically shows a wireless network with value holders indicated by padlocks and key holders indicated by keys.

FIG. 5 shows an exemplary implementation of the encryption scheme for applications. The scheme can be used to enhance existing databases to support secure computing. By replicating the databases and hosting them, for example by using several machines of the same cloud providers, compromising a single machine does not allow an attacker to gain access to the confidential data. Furthermore, many computations that cannot be performed efficiently today can be performed efficiently with the scheme according to the present invention.

In this scenario, the client only needs to distribute the query to the parties, i.e., the databases in the network. Depending on the computation performed, the parties might have to exchange partial results. For example, performing a simple trend analysis of data, e.g. linear regression, has not been possible with conventional schemes, but can be done even for a large number of values with just a few messages of small size between the databases. Thus, in real systems, the overhead due to communication can be less than a second for many operations together.

For data aggregation within a network as a second example application, certain network nodes can be assigned either as key holders, or value holders, or helpers. These nodes can perform aggregation operations such as summing up all values. FIG. 3 shows an example containing only key holders and value holders. Each node in the network encrypts its measurement value using a random key, it transmits the key, e.g. using symmetric encryption, to the nearest key holder and the encrypted value to the nearest value holder. A value holder in turn forwards his partial results to the next encrypted value holder towards the control computer, a key holder forwards to the next key holder.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for computing a secret value comprising a first secret and a second secret using a function including an operation, comprising:
   computing, by a host, a first encrypted value of the first secret with a first key;
   computing, by the host, a second encrypted value of the second secret with a second key;
   sending, by the host, the first encrypted value to a value holder and the first key to a key holder, wherein the value holder and the key holder are independently trusted by the host, and wherein the key holder maintains a plurality of keys for encryption and decryption but does not obtain the first encrypted value;
   computing, by the value holder, a computed encrypted value from the first encrypted value using the function including the operation, the operation comprising at least one of: multiplication, logical AND, addition, or logical XOR of the first and second secrets; and
   computing, by the key holder, a computed key from the first key using the function including the same operation used by the value holder to compute the computed encrypted value.

2. The method according to claim 1, comprising:
   indicating, by the host, that the first encrypted value is of type of encrypted value and the first key is of type of key.

3. The method according to claim 2, comprising:
   receiving, by the host, the computed encrypted value and the computed key, independently from the value holder and the key holder; and
   decrypting, by the host, the computed encrypted value from the computed encrypted value using the computed key, to obtain a computed secret value.

4. The method according to claim 2, further comprising:
   sending, by the host, the second encrypted value to the value holder and the second key to the key holder;
   computing, by the value holder, the computed encrypted value from the first and second encrypted value using an encryption schema having distributive and/or associative properties;
   computing, by the key holder, the computed key from the first and second key using the encryption schema.

5. The method according to claim 2, further comprising:
   sending, by the host, the second encrypted value to the key holder and the second key to the value holder;
   computing, by the value holder, the computed encrypted value from the first encrypted value and the second key using an encryption schema having distributive and/or associative properties;
   computing, by the key holder, the computed key from the second encrypted value and the first key using the encryption schema.

6. The method according to claim 1, comprising:
   receiving, by the host, the computed encrypted value and the computed key, independently from the value holder and the key holder; and
   decrypting, by the host, the computed encrypted value from the computed encrypted value using the computed key, to obtain a computed secret value.

7. The method according to claim 6, further comprising:
   sending, by the host, the second encrypted value to the value holder and the second key to the key holder;
   computing, by the value holder, the computed encrypted value from the first and second encrypted value using an encryption schema having distributive and/or associative properties;
   computing, by the key holder, the computed key from the first and second key using the encryption schema.

8. The method according to claim 6, further comprising:
   sending, by the host, the second encrypted value to the key holder and the second key to the value holder;
   computing, by the value holder, the computed encrypted value from the first encrypted value and the second key using an encryption schema having distributive and/or associative properties;
   computing, by the key holder, the computed key from the second encrypted value and the first key using the encryption schema.

9. The method according to claim 1, further comprising:
   sending, by the host, the second encrypted value to the value holder and the second key to the key holder;
   computing, by the value holder, the computed encrypted value from the first and second encrypted value using an encryption schema having distributive and/or associative properties;
   computing, by the key holder, the computed key from the first and second key using the encryption schema.

10. The method according to claim 1, further comprising:
    sending, by the host, the second encrypted value to the key holder and the second key to the value holder;
    computing, by the value holder, the computed encrypted value from the first encrypted value and the second key using an encryption schema having distributive and/or associative properties;
    computing, by the key holder, the computed key from the second encrypted value and the first key using the encryption schema.

11. The method according to claim 1, further comprising:
    computing the second encrypted value of the second secret from the first encrypted value and the first key;
    computing the computed key using the first key and the second key associated with the second encrypted value; and
    computing the computed encrypted value using either the second key or the computed key such that the computed encrypted value can be decrypted using either the second key or the computed key.

12. The method according to claim 1, wherein the operation comprises a trigonometric operator, comprising:
    computing, using the function including the trigonometric operator, the computed encrypted value based on the first key and the second key as well as the first encrypted value and the second encrypted value, wherein the second encrypted value is generated using the second key.

13. The method according to claim 1, wherein the function comprises a logarithmic operator, comprising:
    computing, using the function including the logarithmic operator, the computed encrypted value based on the first encrypted value, a value depending on the first key, the first secret and a constant.

14. The method according to claim 1, further comprising:
receiving, by the host, the computed encrypted value from the value holder;
receiving, by the host, the computed key from the key holder; and
computing, by the host, the function, including applying the operation to the received computed encrypted value and the received computed key.

15. A system for computing a secret value comprising a first secret and a second secret using a function including an operation, comprising:
a host configured to compute a first encrypted value of the first secret with a first key;
a host configured to compute a second encrypted value of the second secret with a second key;
a value holder configured to receive the first encrypted value from the host;
a key holder configured to receive the first key from the host;
wherein the value holder and the key holder are independently trusted by the host;
wherein the key holder maintains a plurality of keys for encryption and decryption but does not obtain the first encrypted value; and
wherein the value holder is further configured to compute a computed encrypted value from the first encrypted value using the function including the operation, the operation comprising at least one of: multiplication, logical AND, addition, or logical XOR of the first and second secrets, and
the key holder is configured to compute a computed key from the first key using the function including the same operation used by the value holder to compute the computed encrypted value.

16. The system according to claim 15, wherein the host is configured to:
indicate that the first encrypted value is of type of encrypted value and the first key is of type of key.

17. The system according to claim 15, wherein the host is configured to:
receive the computed encrypted value and the computed key, independently from the value holder and the key holder; and
decrypt the computed encrypted value from the computed encrypted value using the computed key, to obtain a computed secret value.

18. The system according to claim 17, wherein the host is further configured to:
receive the computed encrypted value from the value holder;
receive the computed key from the key holder; and
compute the function including the operation, including applying the operation to the received computed encrypted value and the received computed key.

* * * * *